Jan. 24, 1967    R. S. RADCLIFFE    3,299,570
CANOPY

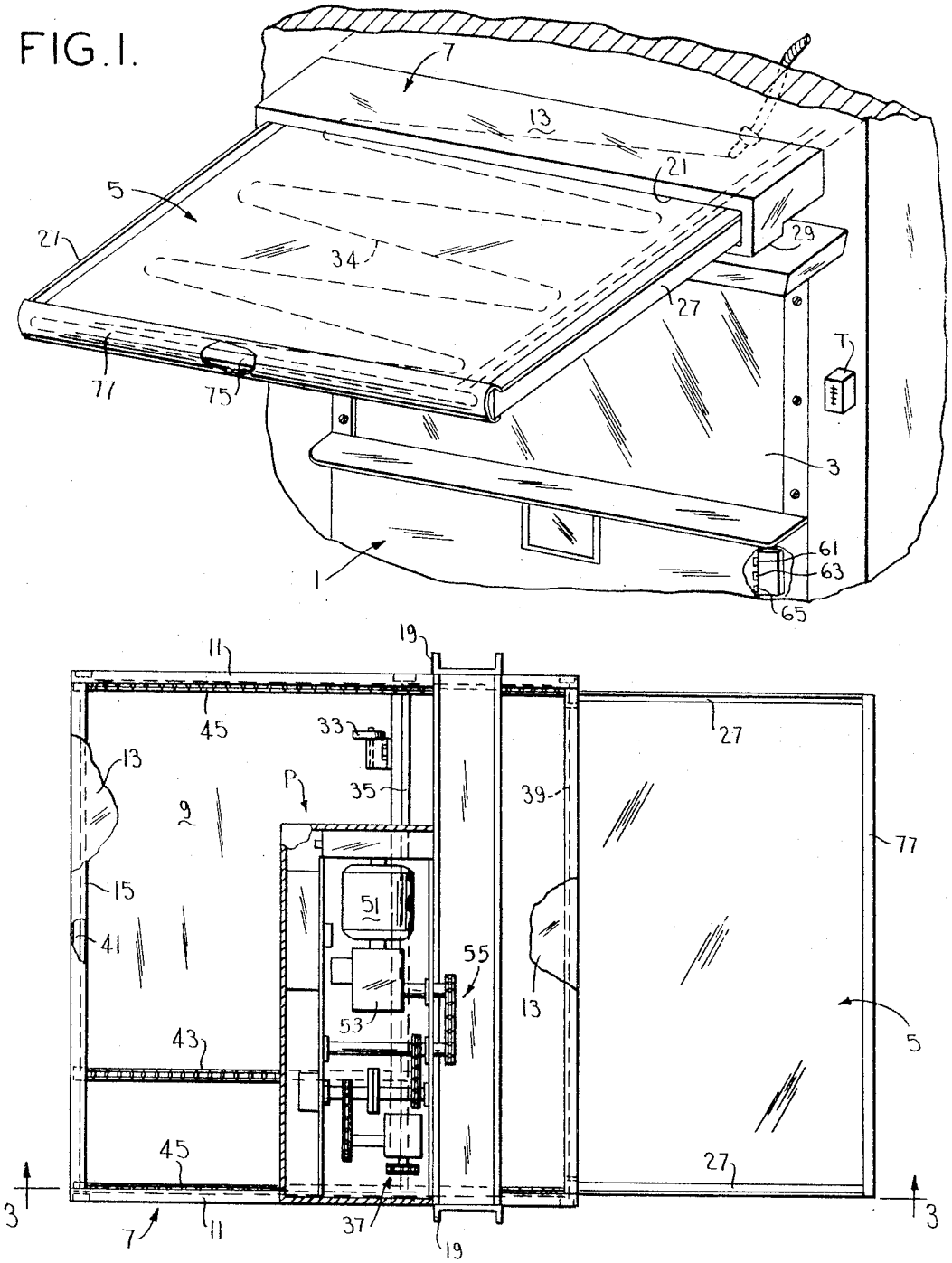

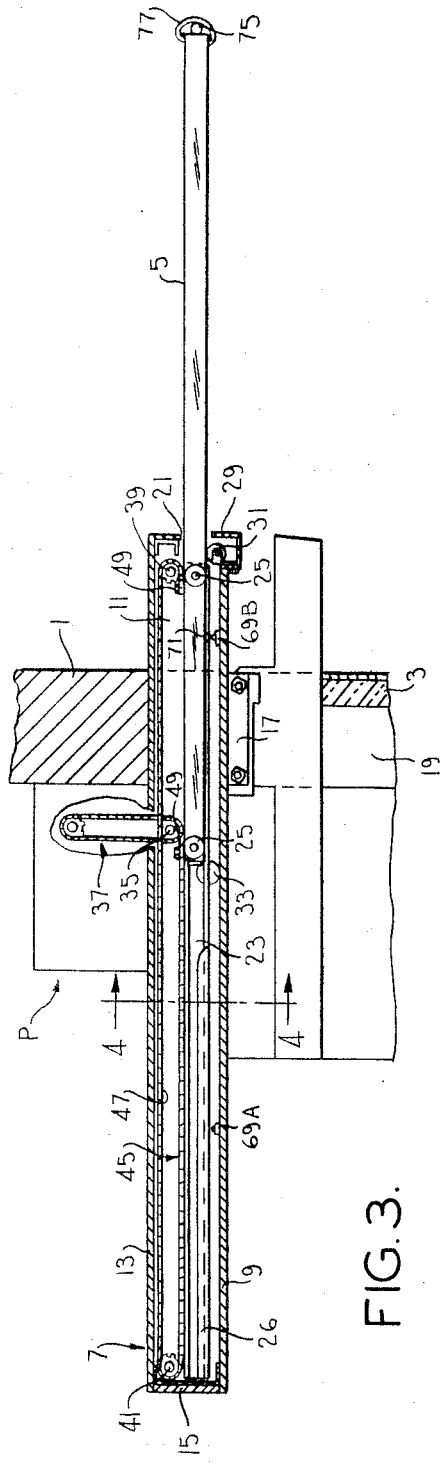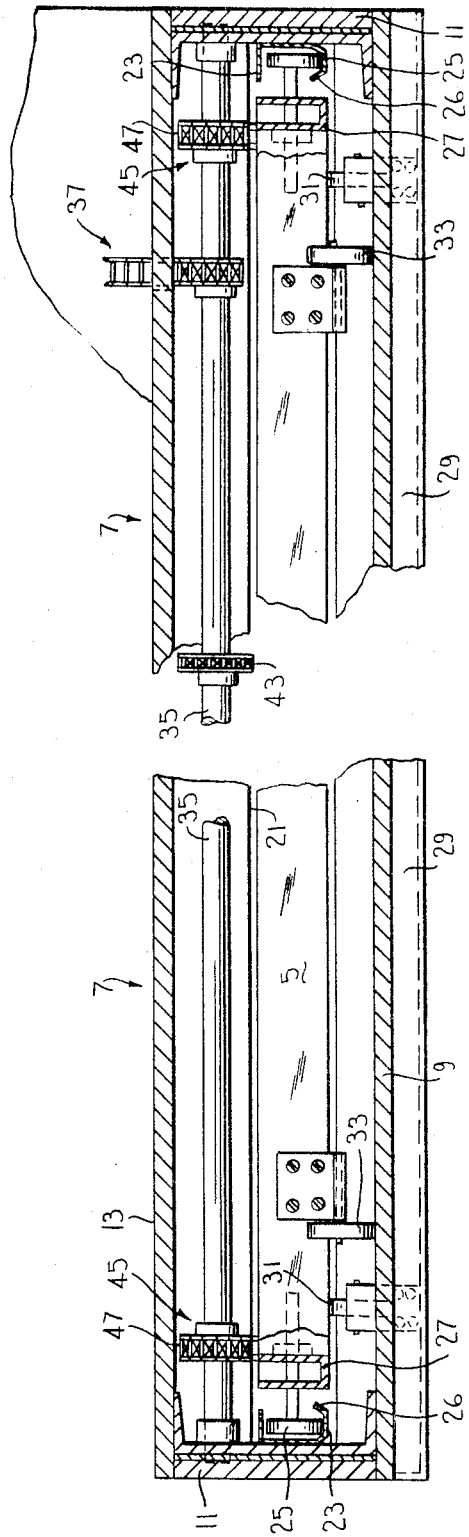

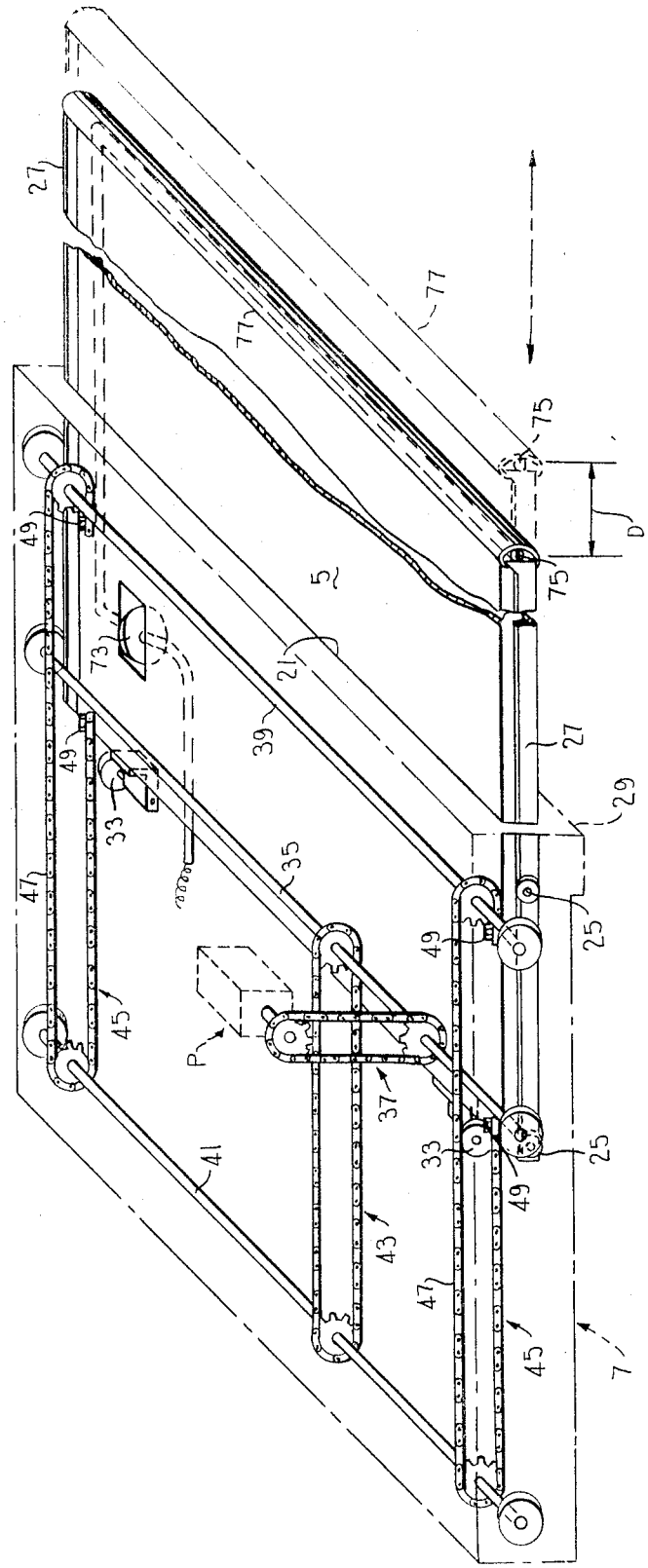

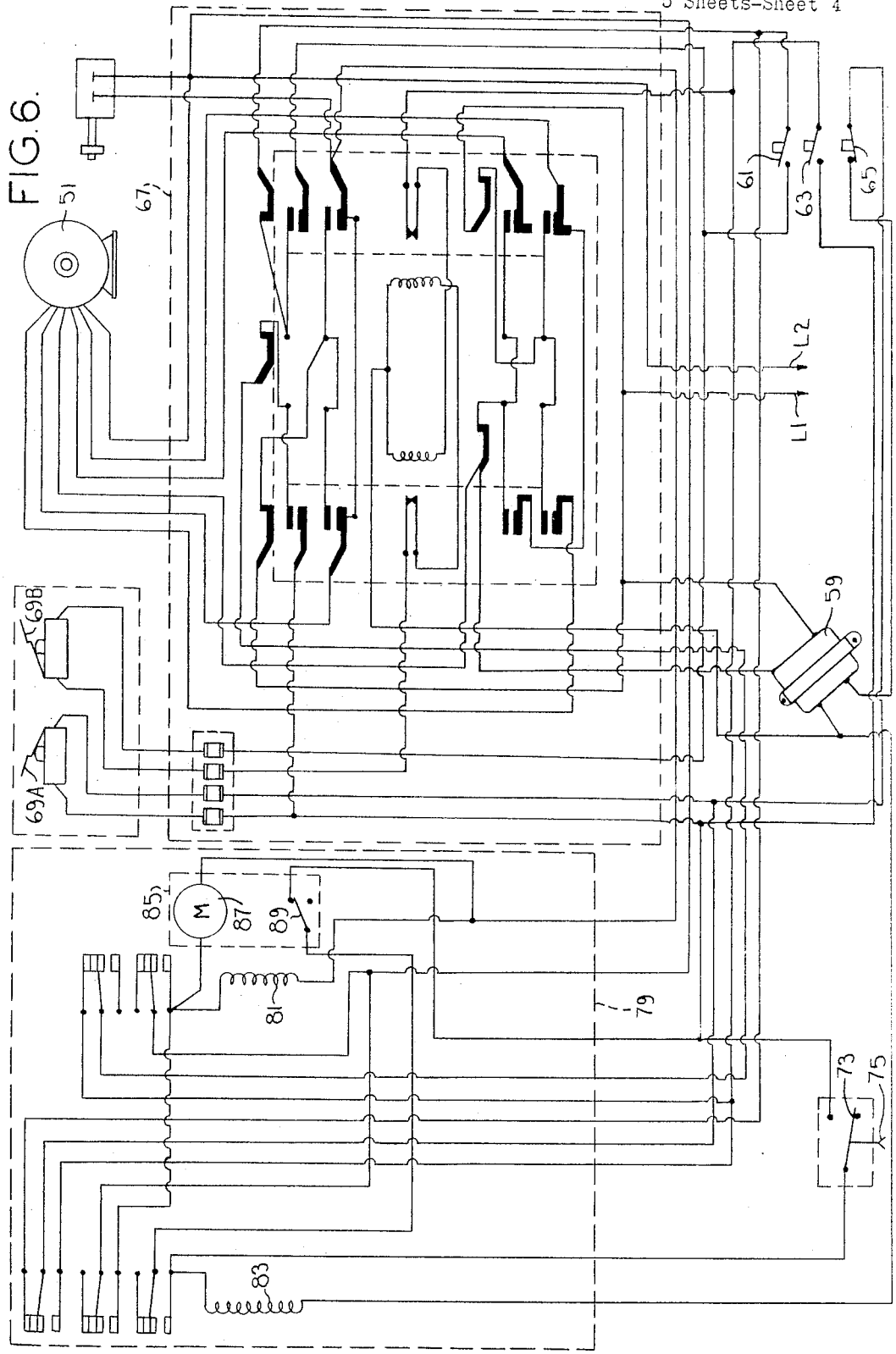

Filed Dec. 3, 1964    5 Sheets-Sheet 5

United States Patent Office 3,299,570
Patented Jan. 24, 1967

3,299,570
CANOPY
Richard S. Radcliffe, 17 Babler Lane,
Ladue, Mo. 64758
Filed Dec. 3, 1964, Ser. No. 415,600
3 Claims. (Cl. 49—27)

This invention relates to a canopy, and more particularly to an extensible and retractable canopy for drive-in facilities, such as a drive-up bank facility, and the like.

Heretofore, if any shelter has been provided for the front of a drive-up facility, such as the front of a teller's cage, the shelter has been provided by a fixed canopy construction, which may have columns for supporting the outer end of the canopy. Such a canopy, even if unsupported at its outer end, may block access to the teller's window of higher vehicles. In certain cases, the teller's cage fronts on a narrow street or alley, used by truckers for servicing adjacent business establishments, and provision of a fixed canopy is prohibited in such cases because of its interference with traffic.

Among the several objects of this invention may be noted the provision of a canopy for a drive-up facility, such as a teller's cage of a drive-up banking establishment, which canopy may be extended from within the facility in overhead relation thereto to a projected position cantilevered outward from the facility in which it provides shelter at the front of the facility, and retracted back into the facility for allowing higher vehicles to drive up to the front of the facility or for allowing flow of traffic; the provision of such an arrangement in which the canopy is power-driven for extension and retraction under control of the occupant of the facility; the provision of such an arrangement in which the canopy is automatically retracted if, in being extended, it strikes a vehicle or other object or if, when occupying an extended position, it is struck by a vehicle or other object; the provision of such an arrangement adapted for carrying off rain water from the canopy when it is extended, and for preventing accumulation of snow or ice on the canopy when it is extended; and the provision of such an arrangement in which substantially the entire length of the canopy may be cantilevered out from the facility when the canopy is fully extended. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective showing an installation of this invention for a typical drive-in bank teller's cage;

FIG. 2 is a plan showing the canopy, its mounting and its drive, with parts broken away and shown in section;

FIG. 3 is a section taken on line 3—3 of FIG. 2;

FIG. 4 is an enlarged section taken on line 4—4 of FIG. 3;

FIG. 5 is a perspective of the canopy drive;

FIG. 6 is a circuit diagram;

Corresponding reference characters indicate corresponding parts throughout the several views of the drawings.

Figure 7:
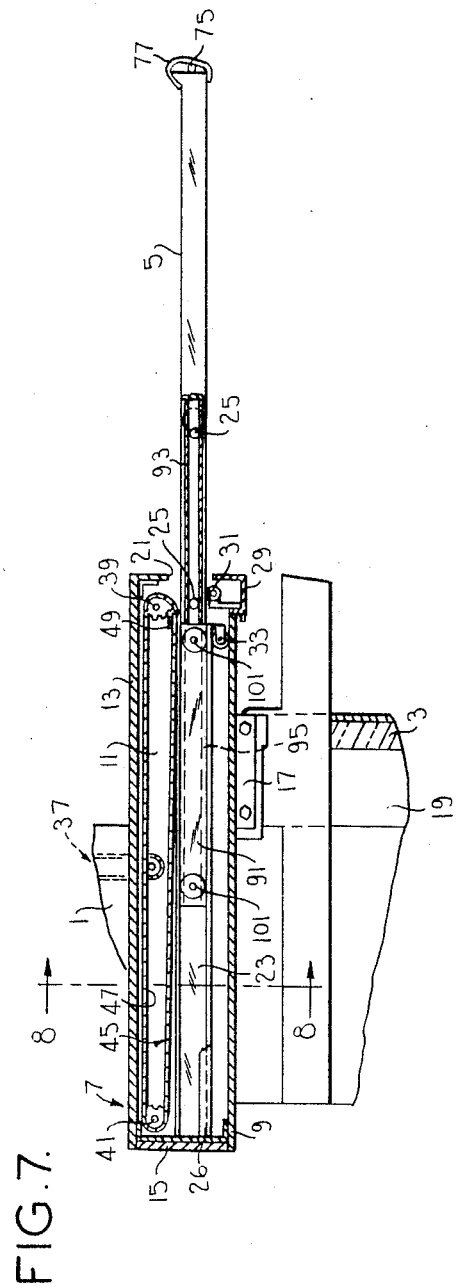
FIG. 7 is a section similar to FIG. 3 showing a modification.

Referring first to FIG. 1 of the drawings, there is indicated at 1 a building structure such as a teller's cage of a drive-in banking establishment. As will be understood, this has a window such as indicated at 3, and is constituted for transation of business with the teller occupying the cage by the driver of a vehicle parked directly in front of the cage. In accordance with this invention, means is provided in the building structure 1 for mounting a canopy 5 for movement from a retracted position within said structure in overhead relation to the drive-up window 3, to an extended position projecting out of the structure (as shown in FIG. 1) for sheltering the front of the structure. As will appear, the canopy is power-driven in and out, under control of the occupant of the cage facility.

Referring to FIGS. 1–5, the means for mounting the canopy is shown to comprise an elongate shallow box housing 7 having a bottom 9, sides 11, a top 13, and a rear wall 15. It is mounted in position at the ceiling of the cage at an elevation above the top of the window, as by having mounting brackets such as indicated at 17 in FIG. 3 bolted to channel-section uprights 19 of the cage. The canopy 5, which is simply a flat rigid canopy (and which may be formed of sheet aluminum so as to be lightweight), is slidable in and out of the housing through an opening 21 at the front of the housing. Channel-section tracks 23 are provided on the inside of the sides 11 of the housing, and the canopy has rollers 25 at its sides riding in these tracks, being confined in the tracks by lips 26 on the lower flanges of the tracks.

Extending on the outside of the sides of the canopy are gutters 27 for carrying off rain water from the canopy when it is extended. These gutters are closed at their forward ends and open at their rearward ends. Water drains from the rearward ends of the gutters onto the bottom 9 of the housing, which is preferably inclined slightly from rear to front for flow of water along the bottom of the housing to a transverse gutter 29 at the lower front of the housing. Downspouts (not shown) may extend down from the ends of gutter 29 for carrying off water therefrom.

At the front end of housing 1 beneath and adjacent the opening 21 are two rollers 31 which project above bottom wall 9 of the housing and engage the bottom of canopy 5 to support it at the forward end of the housing as it extends and retracts. Rollers 31 are conveniently mounted in gutter 29. Attached to the rear end of the canopy are rollers 33 which ride on the inner surface of the bottom wall of the housing and support the rear end of the canopy.

The canopy is preferably heated by means of an electric heating element 34 controlled by a thermostat T on the outside of cage 1. Heating element 34 prevents accumulation of ice or snow on the canopy.

A shaft 35 is journaled in housing side walls 11 and is driven from a power unit P by a chain and sprocket drive 37. At the front and rear of housing 1 are shafts 39 and 41, shaft 41 being driven from shaft 35 by a chain and sprocket drive 43. Shaft 41 powers chain drives 45 for the canopy, chains 47 of these drives being attached at their ends to the canopy as indicated at 49. Thus when shaft 35 is driven from the power unit in one direction, it powers the chain 45 for extending the canopy relative to housing 7, and when the power unit drives shaft 35 in the opposite direction the canopy is retracted into the housing.

In FIG. 2 of the drawings, the power unit P is shown to comprise an instant-reversing electric motor 51 coupled to a speed reducer 53 which drives speed reducing gearing generally designated 55. The output shaft of gearing 55 is coupled to shaft 35 by the chain and sprocket drive 37.

FIG. 6 diagrammatically illustrates the control for operating motor 51 for extending and retracting canopy 5. This control is powered from a 110 volt, 60 cycle power source by lines designated L1 and L2, line L1 being the neutral line. A transformer 59 steps the voltage down to 24 volts for operating portions of the apparatus, other portions being operated directly from the 110 volt source. As shown at the lower right of FIG. 6, the control comprises a normally open manually operable switch 61 which is closed for extending the canopy, a normally open manually operable switch 63 which is closed for retracting the canopy, and a normally closed manualy operable switch 65 for stopping movement of the canopy. These are located in the cage 1 for actuation by the occupant. Lines L1 and L2, transformer 59 and switches 61, 63 and 65 are wired to a conventional reversing relay generally designated 67 which in turn is wired to the motor 51 and controls operation of motor 51 in response to actuation of switches 61, 63 and 65.

Two normally closed limit switches 69A and 69B are also wired to relay 67 and connected in the circuit so that when they are opened they will limit extension or retraction of the canopy. The switches 69A and 69B are mounted in housing 1 as shown in FIG. 3 for actuation by a lug 71 on the canopy in such manner that switch 69A will be opened when the canopy reaches its innermost retracted position and switch 69B will be opened when the canopy reaches its outermost extended position.

The control illustrated in FIG. 6 further includes means for automatically effecting a partial retraction of the canopy if the canopy, in being extended, strikes a vehicle or other object or if a vehicle or other object comes into contact with the forward end of the extended canopy. This means comprises an air-pressure-operated switch 73 which is operable by air pressure from an air tube sensor 75 extending on the front of the canopy within a cover 77 loosely mounted on the front of the canopy. When cover 77 is pushed in relative to the canopy, it squeezes the tube 75 to pressurize and close the switch 73. The latter is connected to a relay 79 having a 110 volt coil 81 and a 24 volt coil 83 which operate sets of contacts shown immediately above the coils. Associated with relay 79 is a conventional timer mechanism 85 which comprises a timer motor 87 and a normally closed switch 89. When switch 73 is closed by sensor 75, timer motor 87 and switch 89 are both connected in the circuit and motor 87 operates for a preset time after which it opens switch 89 and subsequently recloses it.

The control is wired as shown in FIG. 6 so that closing of switch 61 effects energization to motor 51 to operate drive 9 in one direction and extend the canopy 5. Similarly, when switch 63 is closed the motor 51 is driven in the other direction for retracting the canopy. Closing switches 61, 63 energizes holding circuits in relay 67 for providing current to motor 51 until the associated limit switch 69A or 69B is opened. Thus switches 61, 63 do not need to be held closed while the canopy completes its travel. Switch 65 can be opened to stop movement of the canopy in either direction at any time. When the sensor 75 is contacted by an object either as a result of the object approaching the canopy or by the canopy approaching the object, switch 73 is closed to provide current to switch 89 of the timer mechanism 85 which closes the retracting circuit to the motor 51 to retract the canopy. Retraction of the canopy continues until motor 87 is driven the predetermined time required for opening switch 89, at which time motor 51 stops and the partial retraction of the canopy resulting from contact of sensor 75 is terminated. A typical distance the canopy is retracted when switch 73 is closed is indicated at D in FIG. 5 and may be regulated by setting of the timer 85. This partial retraction of the canopy occurs whether it is being extended or is stationary at the time switch 73 is closed and prevents damage to the canopy due to contact with or by trucks, etc.

Operation of FIGS. 1–6 embodiment is as follows:

Assuming canopy 5 is in its retracted position in housing 7, closing of switch 61 provides electric current to motor 51 to rotate shaft 41 in counterclockwise direction as viewed in FIGS. 3 and 5. This pulls the upper reach of chains 47 rearwardly in housing 7 to pull canopy 5 forward out of the housing. Extension of the canopy is terminated by actuating the stop switch 65, by opening of limit switch 69B, or by sensor 75 closing switch 73 to partially retract the canopy a short distance such as indicated at D in FIG. 5 and open the extension holding circuit. The canopy, when extended, is self-supporting and is substantially free of damage which might be caused by engagement of the outer end of the canopy with a vehicle or other object.

When the canopy is not needed, switch 63 may be closed to provide current to motor 51 to reverse its rotation so that shaft 41 is rotated in a clockwise direction as viewed in FIGS. 3 and 5, which pulls the lower reach of chain 47 rearwardly for retracting the canopy. Retraction of the canopy terminates when switch 69A or switch 65 is opened.

Figure 8:
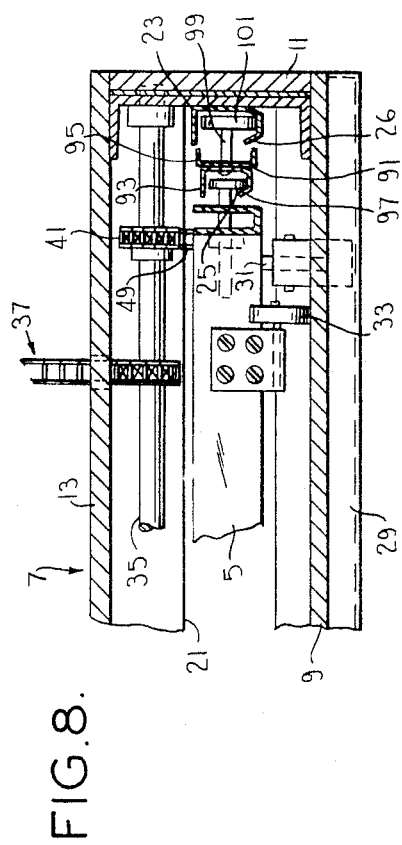
FIG. 8 is an enlarged fragmentary section taken on line 8—8 of FIG. 7.

In the embodiment shown in FIGS. 7 and 8, a track 91 is interposed between the sides of the canopy and tracks 23. While only one track 91 is shown in FIG. 8, it will be understood that there is one of these tracks at each side. Track 91 comprises two elongated channels 93 and 95 mounted back-to-back, the channel 93 receiving the rollers 25 at the sides of the canopy. Channel 93 has along its lower edge an unturned lip 97 which limits lateral movement of rollers 25. Pins 99 carried by track 91 mount rollers 101 which ride in tracks 23.

With this construction the canopy 5 and tracks 91 are movable relative to each other and relative to the tracks 23. Thus as the canopy is initially extended or retracted it may move with or relative to tracks 91 while it is moving relative to tracks 23. The canopy is substantially wholly supported by track 91 when it is at its fully extended position as shown in FIG. 7. As a result, the canopy can be almost entirely extended from housing 1 as shown in FIG. 7, there being no need to limit full extension of the canopy to keep it from tilting as is the case in the FIGS. 1–6 embodiment. When the canopy and tracks 91 are fully extended, the rollers and associated tracks cooperate to hold the canopy in a generally horizontal position. In other respects the device shown in FIGS. 7 and 8 is the same or substantially the same construction and operation as the FIGS. 1–6 embodiment.

The FIGS. 7 and 8 construction permits the canopy 5 to be extended a greater distance than the same size panel when used with the support mechanisms of FIGS. 1–5 or, as an alternative, the same panel extension can be achieved when the housing 7 and associated parts are smaller. Greater extension can also be achieved by using two panels similar to the panel shown in FIGS. 1–5, one of which rides on the other. In other words, two canopies can be used with one of the panels extending from the other of the panels.

The invention has been described in connection with a drive-in facility, particularly a drive-up bank facility. It will be understood that the extensible canopy can also be used on buildings having walk-up facilities, at theater entrances, for covering swimming pools by extending from an adjacent building, and for other installations where a canopy is periodically required.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An extensible canopy device for a drive-up facility comprising a housing having an opening at one end constituting its front, a canopy mounted in said housing for movement from a retracted position within the housing to an extended position projecting out through said opening, a drive for the canopy comprising a pair of chains extending lengthwise of the housing and attached to the canopy, a reversible power drive for said chains, said power drive including a reversible electric motor, means for effecting operation of the motor in one direction or the other for extending and retracting the canopy, means for limiting the extension and retraction of the canopy comprising limit switches interconnected with the motor, and means for actuating the motor to effect retractive movement of the canopy in response to engagement of the canopy with an object when the canopy is being extended or engagement of the canopy by an object when the canopy is in an extended position, said means for actuating the motor comprising a sensor on the forward end of the canopy and means responsive to actuation of the sensor for timing a limited period of operation of the motor to effect a partial retraction of the canopy.

2. An extensible canopy device comprising an elongate shallow box housing having a bottom, sides and a top and an opening at one end constituting its front, a pair of tracks, one at each side of the housing, a canopy having rollers at the sides riding in the tracks and movable from a retracted position within the housing to an extended position projecting out through said opening, a pair of shafts extending across the housing adjacent the front and rear of the housing, a pair of sprockets on each of said shafts, a pair of chains trained around said sprockets and attached to the canopy, a reversible power drive for one of said shafts, the chains being located above the canopy and having their lower reaches attached to the canopy, said power drive including an electric motor mounted on top of said housing, said motor being a reversible motor, means for effecting operation of the motor in one direction or the other including first and second manually operable switches, limit switches controlling said motor to deenergize it upon full retraction and full extension of the canopy, and means for actuating the motor to effect retractive movement of the canopy in response to engagement of the canopy with an object when the canopy is being extended or engagement of the canopy by an object when the canopy is in an extended position, said means for actuating the motor comprising a sensor on the forward end of the canopy and means responsive to actuation of the sensor for timing a limited period of operation of the motor to effect a partial retraction of the canopy.

3. An extensible canopy device comprising an elongate shallow box housing having a bottom, sides and a top and an opening at one end constituting its front, a pair of tracks, one at each side of the housing, a canopy having rollers at the sides riding in the tracks and movable from a retracted position within the housing to an extended position projecting out through said opening, a pair of shafts extending across the housing adjacent the front and rear of the housing, a pair of sprockets on each of said shafts, a pair of chains trained around said sprockets and attached to the canopy, a reversible power drive for one of said shafts, a second pair of tracks each one of which is located between a track of the first pair of tracks and the sides of the canopy, and rollers fastened to the canopy and riding on the second pair of tracks for relative movement between the canopy and the second pair of tracks, the rollers supporting the canopy on the first pair of tracks being coupled to the second pair of tracks for movement with them relative to the first pair of tracks.

References Cited by the Examiner
UNITED STATES PATENTS

| | | | |
|---|---|---|---|
| 2,111,251 | 3/1938 | Spilsbury | 52—173 X |
| 2,145,435 | 1/1939 | Smith. | |
| 2,724,875 | 11/1955 | McKinley | 52—78 X |
| 2,758,836 | 8/1956 | Purdy | 268—59 |
| 2,963,290 | 12/1960 | Bauer | 268—30 |
| 3,067,813 | 12/1962 | Henatsch | 160—32 |

HARRISON R. MOSELEY, *Primary Examiner.*

J. K. BELL, *Assistant Examiner.*